(12) United States Patent  (10) Patent No.: US 9,099,127 B1
Shintani et al.  (45) Date of Patent: Aug. 4, 2015

(54) DUAL MAGNETIC SENSOR FOR MULTI-INPUT MAGNETIC RECORDING

(71) Applicant: HGST Netherlands B. V., Amsterdam (NL)

(72) Inventors: Taku Shintani, Odawara (JP); Yohji Maruyama, Iruma (JP); Kouichi Nishioka, Hiratsuka (JP); Masafumi Mochizuki, Chigasaki (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/292,749

(22) Filed: May 30, 2014

(51) Int. Cl.
*G11B 5/39* (2006.01)
*G11B 5/02* (2006.01)

(52) U.S. Cl.
CPC ............... *G11B 5/3945* (2013.01); *G11B 5/02* (2013.01)

(58) Field of Classification Search
USPC .................................... 360/46, 122, 313, 322
See application file for complete search history.

(56) References Cited

U.S. PATENT DOCUMENTS

| | | | |
|---|---|---|---|
| 5,721,008 | A | 2/1998 | Huang et al. |
| 6,185,080 | B1 | 2/2001 | Gill |
| 6,278,589 | B1 | 8/2001 | Gill |
| 6,480,365 | B1 * | 11/2002 | Gill et al. .................. 360/324.11 |
| 7,016,161 | B2 * | 3/2006 | Hayakawa .................... 360/322 |
| 7,072,154 | B2 | 7/2006 | Gill et al. |
| 7,502,193 | B2 | 3/2009 | Albrecht et al. |
| 7,733,595 | B2 | 6/2010 | Lucas et al. |
| 8,514,525 | B2 | 8/2013 | Childress et al. |
| 8,824,106 | B1 * | 9/2014 | Garfunkel et al. ............. 360/316 |
| 2003/0164509 | A1 * | 9/2003 | Gregg ............................ 257/197 |
| 2003/0179510 | A1 * | 9/2003 | Hayakawa .................. 360/324.1 |
| 2003/0214763 | A1 * | 11/2003 | Childress et al. ........... 360/324.2 |
| 2006/0103989 | A1 * | 5/2006 | Hayakawa .................. 360/324.1 |
| 2007/0146939 | A1 * | 6/2007 | Pinarbasi .................. 360/324.11 |
| 2009/0059437 | A1 * | 3/2009 | Gill et al. ....................... 360/314 |
| 2010/0020435 | A1 | 1/2010 | Chen et al. |
| 2012/0205830 | A1 | 8/2012 | Ghosh et al. |
| 2012/0307404 | A1 * | 12/2012 | Braganca et al. ........... 360/245.8 |

OTHER PUBLICATIONS

Horowitz Group, "Algorithms for Robust Performance Control Design," http://www.me.berkeley.edu/~horowitz/Group/CML.html, Feb. 9, 2013, pp. 1-7.

* cited by examiner

*Primary Examiner* — Wayne Young
*Assistant Examiner* — Carlos E Garcia
(74) *Attorney, Agent, or Firm* — Zilka-Kotab, PC

(57) ABSTRACT

A magnetic read head and associated circuitry for reducing side track noise and decreasing read width, thereby providing increased data density. The magnetic read head includes first and second sensor elements that are aligned with one another in a data track direction, with the first sensor element being wider than the second sensor element. Electrical circuitry is connected with the read head in such a manner as to read a first signal from the first sensor element and a second signal from a second sensor element. Because the second sensor element is wider than the first sensor element, it will read more side signal noise from adjacent data tracks than will the second sensor element. The circuitry connected with the first and second sensor element detects and distinguishes the side signal noise and separates it out from the data signal, based sensor width difference and location difference.

12 Claims, 26 Drawing Sheets

DUAL MAGNETIC SENSOR FOR MULTI-INPUT MAGNETIC RECORDING

FIELD OF THE INVENTION

The present invention relates to magnetic data recording and more particularly to a magnetic head and a magnetic recording device using such magnetic head, which incorporates at least two sensors in the same magnetic head slider, and which has a function for adding and subtracting signals from each sensor, having the effect of reducing noise caused by crosstalk from adjacent magnetic tracks and making the magnetic head ideal for high track density magnetic recording.

BACKGROUND

In the current information age, the amount of data handled by society has increased dramatically. This has greatly increased demand for devices that can input, output, and store large amounts of data at very high speeds. One type of magnetic recording and playback device is a hard disk drive. Another type of storage device is a magnetic tape drive. The recording density of magnetic storage devices has steadily increased as perpendicular magnetic recording techniques have been adopted and improved. Currently available magnetic recording devices have the capability of recording magnetic data at a recording density of 650 Gb/in$^2$, but there are problems with thermal fluctuation in these magnetic recording media. Increasing the anisotropic energy of magnetic recording media has been an effective countermeasure, but a sufficient magnetic recording field cannot be generated using a very small magnetic recording head such as would be used in high density recording. Because of this, recording densities have been limited to about 1 Tb/in$^2$.

Assisted recording technologies are currently being researched as a solution to enable recording beyond the 1 Tb/in$^2$ limit, thereby allowing higher magnetic recording densities. Assisted recording technologies can include a recording technology such as shingled recording, wherein a magnetic signal can be written using a magnetic write head with a magnetic write pole width that is larger than the recorded track width. The use of magnetic microwaves or thermal energy have also been explored to assist recording of high-density magnetic information on narrow magnetic tracks.

Playing back magnetic information written to narrow magnetic tracks and converting this information to electrical signals, requires a narrow-track sensor. However, the width of the sensor has a large effect on the sensitivity of a sensor, and the target playback amplitude (S) is not sufficient for a width of 30 nm in magnetic disk devices exceeding 1 Tb/in$^2$. As the width of the recording track becomes smaller, the effect of crosstalk noise from adjacent magnetic information tracks becomes significant. As a result, a signal-to-noise (S/N) ratio needed to realize 1 Tb/in$^2$ cannot be satisfied.

A technique that counters this crosstalk phenomenon has been disclosed in US Patent Application No. 2012/0205830. In this technique, magnetic signals are played back using a plurality of sensors. While this patent application discloses the use of a plurality of sensors it does not provide a sensor arrangement that can solve the problem of crosstalk from adjacent magnetic tracks. Therefore, there remains a need for a system or structure that can reduce or eliminate such adjacent track cross talk at very tight track pitches in order to effectively increase data density beyond the 1 Tb/in$^2$ limit.

SUMMARY

The present invention provides a magnetic read head for data recording that includes a first sensor element having a first track-width and a second sensor element having a second track width that is smaller than the first track-width.

The sensor elements can be arranged so that they are aligned with one another in a data track direction with the second sensor being in a down track direction relative to the first sensor element. The sensor elements can be connected with processing circuitry that can receive a first signal from the first sensor element and a second signal from the second sensor element. The circuitry can compare the first and second signals from the first and second sensor element and can subtract out side track signal noise based on this comparison.

Because the first sensor element is wider than the first sensor element it will pick up more side track noise than the second sensor element. The processing circuitry can detect this difference in signals from the first and second sensor elements and can thereby determine a side track noise signal and then subtract this out from the ultimate signal output. This advantageously allows the combine read head to read a data track at a track width that is smaller than the physical width of either of the sensor elements.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
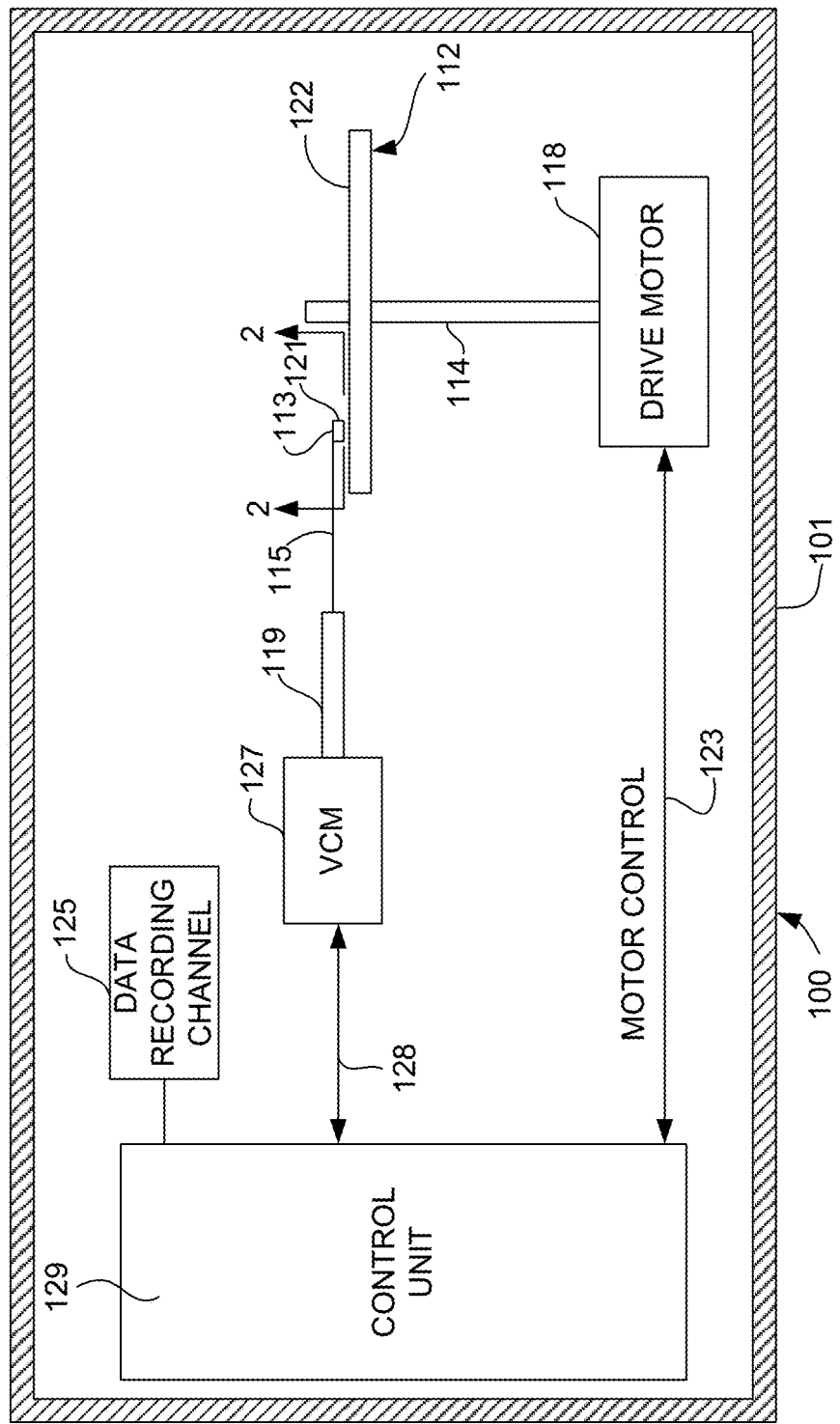
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage, means and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
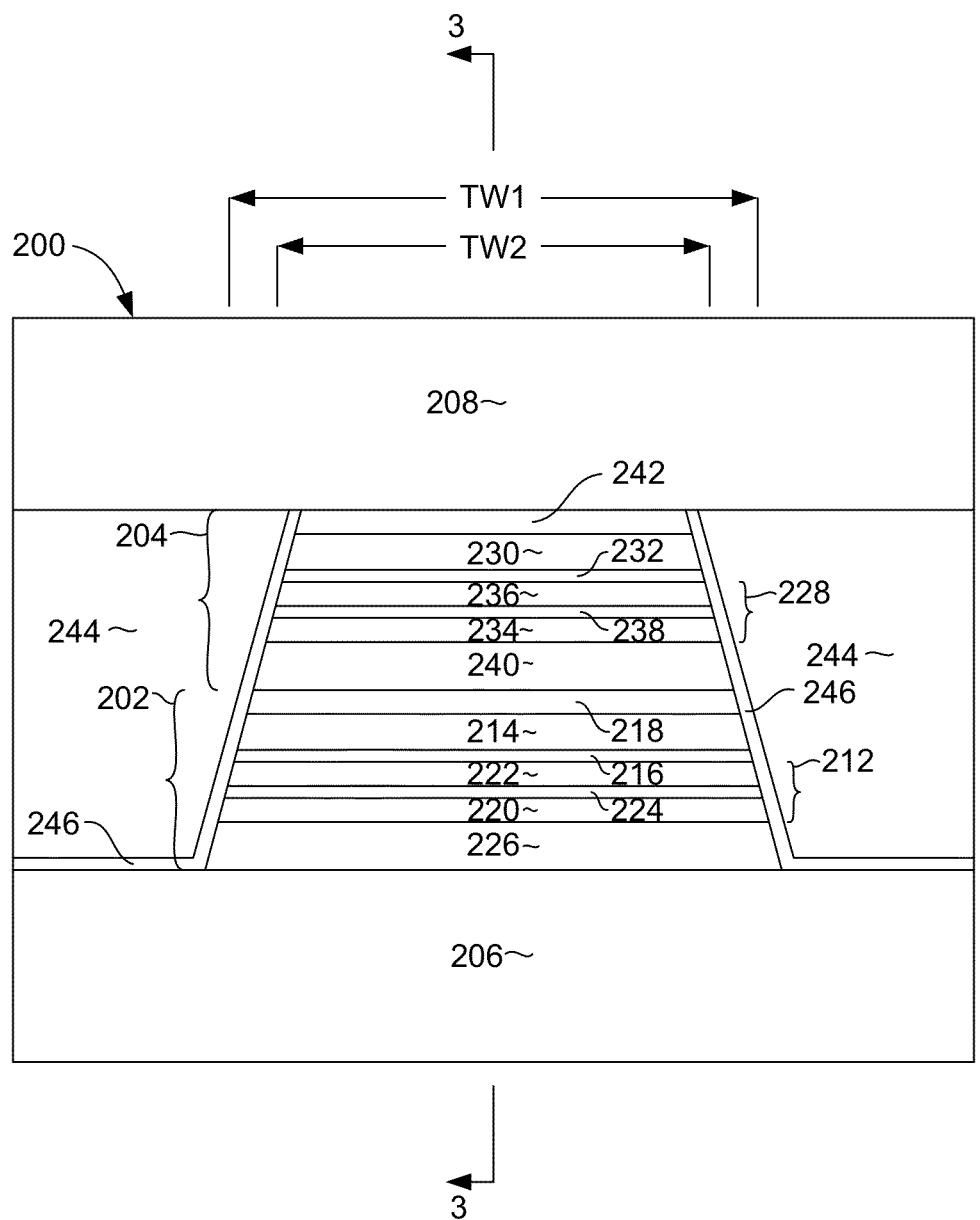
FIG. 2 is a schematic view of a magnetic read sensor as viewed from a media facing surface.
Figure 3:
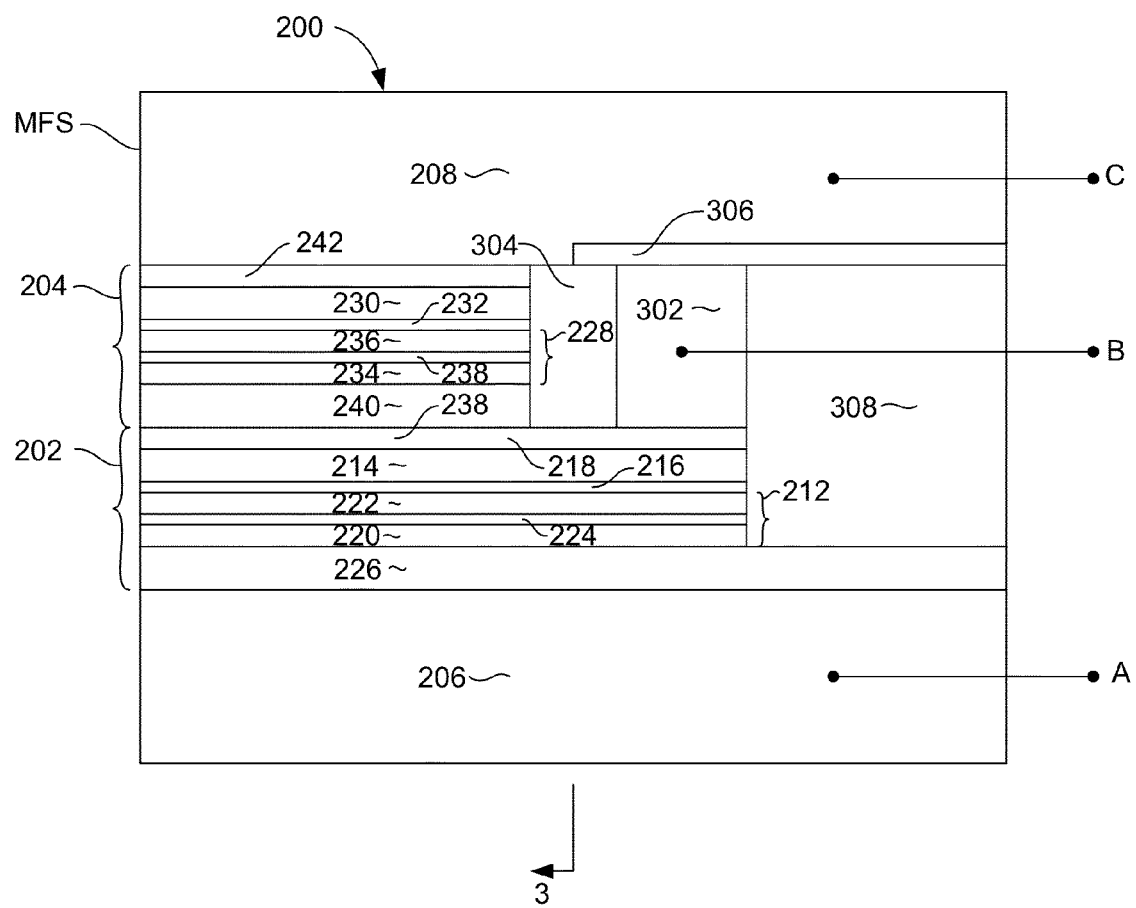
FIG. 3 is a side cross sectional view of the magnetic read sensor as seen from line 3-3 of FIG. 2.

FIG. 2 shows a magnetic read head 200 as viewed from the media facing surface (MFS), and FIG. 3 is a side cross sectional view of the read head 200 as seen from line 3-3 of FIG. 2. The read head 200 includes first and second magnetic sensor elements 202, 204 both of which can be sandwiched between first and second magnetic shields 206, 208.

The first magnetic read element 202 can include a magnetic pinned layer structure 212 a magnetic free layer structure 214 and a non-magnetic barrier or spacer layer 216 that is sandwiched between the pinned and free layer structures 212, 214. If the magnetic sensor element 202 is a giant magnetoresistive GMR element, then the layer 216 can be a non-magnetic, electrically conductive spacer material such as Cu. If the sensor 202 is a tunnel junction magnetoresistive sensor (TMR), then the layer 216 can be a non-magnetic, electrically insulating barrier layer material such as MgO or alumina ($Al_2O_3$). The magnetic free layer can be a material such as Ni—Fe. The first sensor element 202 also includes a non-magnetic capping layer 218 formed over the magnetic free layer 214.

The pinned layer structure 212 can be an anti-parallel coupled structure including first and second magnetic layers 220, 222 that are anti-parallel coupled across a non-magnetic, anti-parallel coupling layer 224 such as Ru. The first and second magnetic layers 220 can be constructed of a material having a high saturation magnetic flux density, such as CoNiFe. The first magnetic layer 220 can be exchange coupled with a layer of anti-ferromagnetic material (AFM) such as IrMn or PtMn 226. The exchange coupling of the first magnetic layer 220 with the AFM layer 226 strongly pins the magnetization of the first magnetic layer 220 in a first direction that is perpendicular to the media facing surface (denoted as MFS in FIG. 3). Anti-parallel coupling between the first and second magnetic layers 220, 222 pins the magnetization of the second magnetic layer 222 in a second direction that is perpendicular to the media facing surface and opposite to the first direction.

The second magnetic sensor element 204 can have a structure similar to that of the first magnetic sensor element 202. Therefore, the second magnetic sensor element 204 can include a magnetic pinned layer structure 228, a magnetic free layer structure 230 and a non-magnetic barrier or spacer layer 232 sandwiched between the magnetic pinned layer structure 228 and magnetic free layer structure 230. The pinned layer structure can be an anti-parallel coupled structure that includes first and second magnetic layers 234, 236 that are anti-parallel coupled across a non-magnetic antiparallel coupling layer such as Ru 238. A layer of anti-ferromagnetic material such as IrMn or PtMn 240 can be exchange coupled with the first magnetic layer 234 of the pinned layer structure 228, and anti-parallel coupling between the first and second magnetic layers 234, 236 pins the magnetization of the second magnetic layer 236 in a direction opposite to that of the first magnetic layer 234. A capping layer 242 can be provided over the top of the magnetic free layer 230.

Magnetic bias structures 244 can be provided at either side of the sensor structure 200 to provide a magnetic bias field for biasing a magnetization of the magnetic free layer structures 314, 320. The magnetic bias structures 244 can be constructed of a hard magnetic material having a high magnetic coercivity, or can be constructed of a soft magnetic material and can be magnetically coupled with the upper shield 208. The magnetic bias structure 244 can be separated from the sensor element layers 202, 204 and from the bottom shield 206 by a thin, non-magnetic, electrically insulating layer 246.

With continued reference to FIG. 2, it can be seen that the sides of the sensor elements 202, 204 taper so that the first sensor element 202 is wider than the second sensor element 204. As those skilled in the art will appreciate, the functional track-width of each sensor element is determined by the width of the magnetic free layer of that sensor element. Therefore, sensor element 202 has a first track-width TW1 and the second sensor element has a second track-width TW2 that is smaller than the first track-width TW1. This will be useful for reasons that will be described further herein below.

FIG. 3, shows a side cross sectional view as seen from line 3-3 of FIG. 2. In FIG. 2, the left edge defines a media facing surface MFS of the sensor 200. It can also be seen that the first sensor element 202 extends significantly further from the media facing surface MFS than does the second sensor element 204. An electrically conductive contact structure 302 is formed over a portion of the first sensor element 202 in the region where the first sensor element 202 extends beyond the second sensor element 204, and makes electrical connection with the first sensor element in this region.

In addition, an electrical insulation structure 304 is formed between the electrically conductive contact structure 302 and the back edge of the second sensor element 204, so as to electrically insulate the electrically conductive contact structure 302 from the second sensor element 204. Also, an insulation layer 306 is formed between the electrically conductive contact structure 320 and the upper shield 208. The electrically insulating structure 304 and electrically insulating layer 306 can be constructed of a material such as alumina ($Al_2O_3$).

In FIG. 3, the electrically conducive contact structure 302 is shown having a back edge that is aligned with the back edge of most of the first sensor structure 202. In FIG. 3, the AFM layer 226 is shown extending beyond the pinned layer structure 212, barrier layer 216, free layer 214, capping layer 218 and conductive contact structure 302. While this is not necessary, it can be the result of a manufacturing process that will be described herein below. In addition, as shown in FIG. 3, the space behind the sensor structures 202, 204 insulation structure 304 and electrically conductive contact structure 302 can be filled with a non-magnetic, electrically insulating fill material such as alumina ($Al_2O_3$) 308.

With continued reference to FIG. 3, electrical leads A, B and C are shown schematically as being connected with various portions of the magnetic head 200. The lead A is connected with the bottom shield 206, the lead B is connected with the electrically conductive contact stud 302 and the lead C is connected with the upper shield 208. Therefore, by being arranged in this manner, a voltage applied across leads A-B will only be applied across the first sensor element 202, whereas a voltage applied across leads B-C will only be applied across the second sensor element 204. A voltage applied across leads A-C would be applied across both sensor elements 202, 204 in series.

It should be pointed out that, while a specific structure is shown in FIG. 3 for connecting the lead B with an upper portion of the first sensor 202, this is by way of example only. Other structures and arrangements may be possible for connecting leads with the sensor elements 202, 204 so that the leads A-B are electrically connected across only the first sensor element 202 and the leads B-C are connected across only the second sensor element.

The above described structure, having two sensor elements 202, 204 and three electrical leads A, B and C makes it possible to detect a playback signal from the first sensor element 202 by applying a sense current between terminals A and B and changing the voltage appearing at the terminals A and B. Similarly, a playback signal can be detected from the second sensor element 204 by applying a sense current between terminals B and C and changing the voltage between these terminals B and C. In addition, it can be understood that while the output from the wider first sensor element 202 is greater than that from the narrower second sensor element 204, the crosstalk noise is also greater, as a result of the increased width. Conversely, the output from the narrower second sensor 204, including on-track data signal, is lower.

Because the ratios of signals from adjacent tracks varies between the two sensors 202, 204 as a result of their different widths, center-track play back signals can be subtracted from the play back signals of the wider first sensor element 202, and adjacent track signals (i.e. crosstalk signals) can be extracted from this. By subtracting this crosstalk data noise from the center-track playback signals, the adjacent information included in these signals can be eliminated. As a result, playback can be performed at a width that is narrower than that of the center (narrow) playback track.

Figure 4:
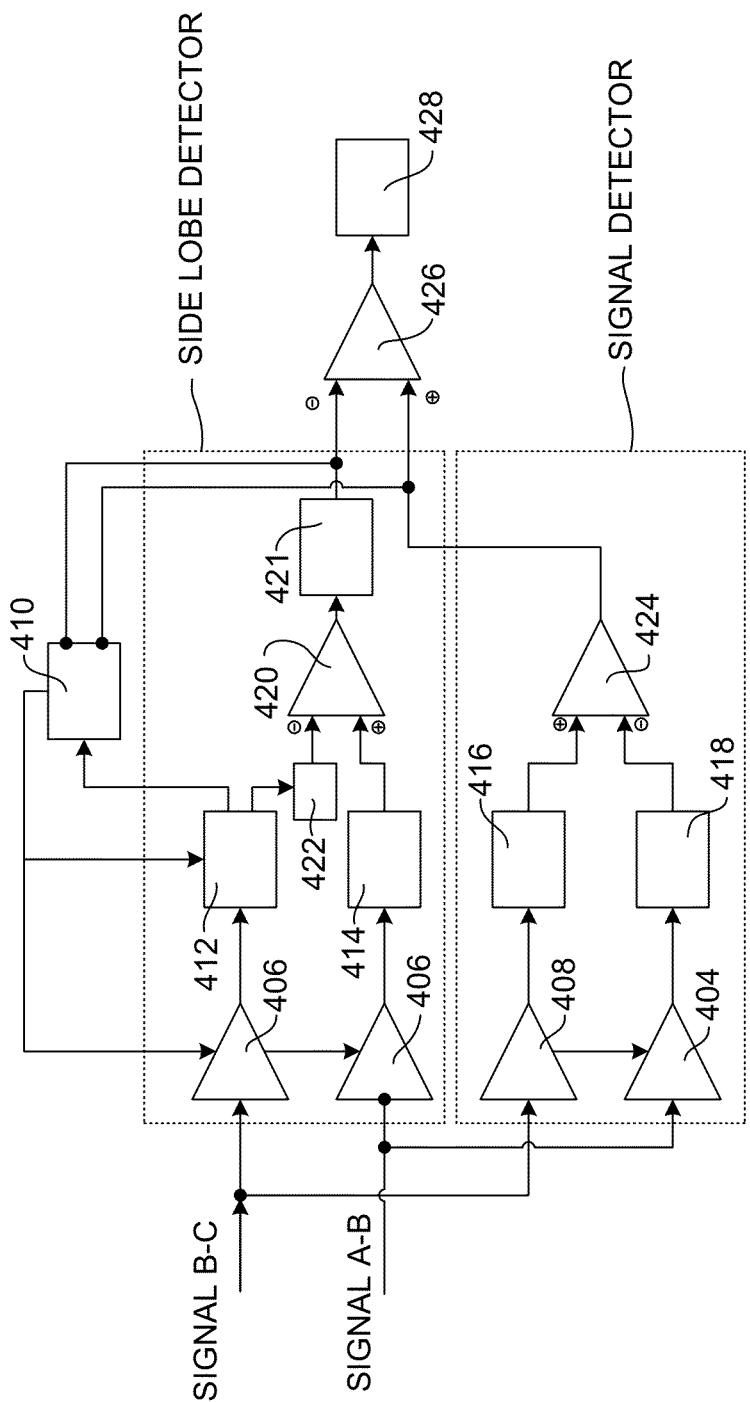
FIG. 4 is a schematic illustration of electrical circuitry for reducing side track interference signal noise.

FIG. 4 shows a schematic illustration of circuitry that could be used to separate out cross-track data noise using magnetic read head structure such as the structure 200 described above. In FIG. 4 a signal derived from between leads A and B (FIG. 3) is denoted as signal A-B, and a signal derived from between leads B and C is denoted as signal B-C. As shown in FIG. 4, signal A-B is inputted to amplifier 402 and amplifier 404. Signal B-C is inputted to amplifier 406 and amplifier 408. The gain of each amplifier 402, 404, 406, 408 is controlled by a gain controller 410. The main outputs of the amplifiers 402, 404, 406, 408 are converted to digital signals by analog-to-digital converters 412, 414, 416, 418. The main output of the signal B-C from the narrower second sensor element 204 (FIG. 2) is referenced by gain controller 410 to determine the amplifier gain.

The output of the analog-to-digital converter 412 from signal B-C and the output from the analog-to-digital converter 414 from signal A-B are inputted to a difference amplifier 420. The required amount of delay is applied to the output of the analog-to-digital converter 412 by a delay circuit 422, in order to compensate for the relative down track location of sensor element 204 relative to that of sensor element 202 (FIG. 2). This delay is applied to the signal from the analog-to-digital converter 412 in order to obtain the same phase state of the outputs from the analog-to-digital converters 412, 414 resulting from the relative down-track relationship (time axis difference) between sensor elements with respect to the movement direction of the magnetic medium.

Because the difference amplifier 241 determines the difference between sensor signal A-B from the wider sensor element 202 and sensor signal B-C from the narrower sensor element 204, the side track signals more readily picked up by the wider sensor element 202 can be calculated. In order to implement the difference process with great precision, amplifiers 406, 402 have to adjust the absolute values of the main output of each sensor 202, 204 (FIG. 2). This process can be performed using an output adjusting means in a case in which each sensor operates independently. The output from the difference amplifier 420 is inputted to the gain controller 421, and this output is connected to the negative terminal of the difference amplifier 426.

The output of signal A-B and signal B-C is inputted to amplifiers 408, 404, which are connected in parallel. The output of amplifier 408 is connected with analog-to-digital controllers 416, 418, and which are connected with gain controller 410 to adjust the amplitude of the signals A-B and B-C. The outputs from the analog-to-digital converters 416, 418 are inputted to a second difference amplifier 424. Here, the difference between the output-adjusted signal A-B and signal B-C is calculated. As discussed above, there is a signal delay (or phase difference) between signals A-B and B-C when the signals are referenced to the same medium point with respect to the time axis, because of the relative relationship between sensor elements 202, 204 (FIG. 2). By determining the difference between the two signals A-B, B-C, the played back signals are differentiated with respect to the time axis (delay period).

Play back signals in perpendicular magnetic recording are known to be dependent on the integrated amount of magnetic charge. In order to raise signal resolution, the sensor can be housed between a pair of magnetic shields as discussed above with reference to FIGS. 2 and 3. Here, even greater resolution can be realized by differentiating the two signals which have been a difference with respect to the time axis.

The resolution here is determined by the amount of signal delay between the two sensors 202, 204 described above with reference to FIG. 2 as a result of their locations relative to one another. The amount of delay can be adjusted by adjusting the thickness of the first non-magnetic capping layer 218 (FIG. 2). The amount of delay can also be adjusted by inserting a delay circuit at the output of the gain controller 418 and inserting a delay circuit in the gain controller 223. The amount of delay can also be adjusted by changing the location of the head over the media (e.g. outer or inner peripheral position over a magnetic disk if the device is used in a disk drive system).

The on track-signal from the difference amplifier 424 is extracted and the output is inputted to the difference amplifier 426. The difference amplifier 260 subtracts the crosstalk signals previously obtained from the on-track signals to reduce the crosstalk noise included in the on-track signals. Afterwards, the output from the difference amplifier 526 is sent to a decoder/encoder 428 and converted to bit information.

Figure 5:
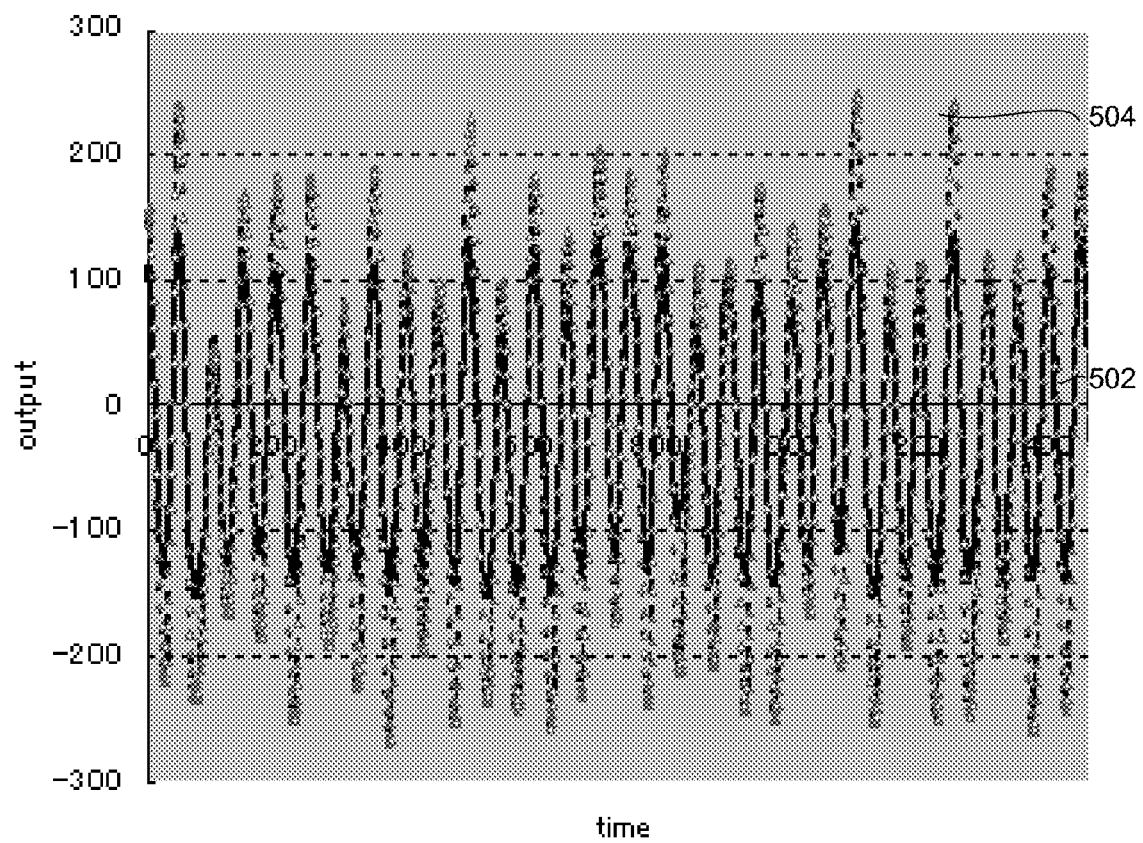
FIG. 5 is a graph showing a sensor output waveform.

The operations and effect of the above described structure and method will now be explained with reference to FIG. 5. FIG. 5 shows the output signal wave form when the magnetized state is played back using playback elements with a track width ($T_{WR}$) of 100 nm and 75 nm. The solid line 502 represents the waveform for the track width of 75 nm, and the dotted line 504 represents the waveform for the track width of 100 nm. In each case, the playback is centered on the center line of the three tracks (the center line of the center track). The output from the track width of 100 nm, indicated by the dotted line 504 is clearly higher than that of the track width 75 indicated by the dashed line 502. As mentioned earlier, playback sensitivity is dependent on the width of the playback track.

Given that the width of the center track is approximately 75 nm, it can be inferred that some of the underlying signals written to the adjacent track with a wavelength for a track width of 100 nm have spilled over. It is clear then that the magnetic information for the center track is primarily included in the playback wavelength for the track width of 75 nm which is for the narrower center track. When playback output from the track width of 75 nm is sufficient, the playback elements and subsequent signal processing are not necessary. However, as mentioned above, the playback width strongly influences playback sensitivity, and the target playback sensitivity cannot be obtained from a track width of 30 nm or less. The main reason for this is that the miniaturization of the free layers constituting the sensor also miniaturizes the reaction region, reducing output, increasing the instability of the free layers, and interfering with the strengthening of domain control used to offset this.

In order to overcome this, techniques such as those described above can be used to playback magnetic tracks using wider sensors. The above described structure and process uses a method of subtracting adjacent track signals from wider playback signals. For this reason, at least two sensors of different widths are used, and the output of the narrower sensor is subtracted from the output of the wider sensor to extract adjacent track information. This can be subtracted from the played back track signals to eliminate adjacent track information included in these signals, and achieve playback at a width narrower than the center (narrower) playback track width.

More specifically, in the present example, playback signal output is processed according to the following equations. This processing corresponds to the circuit functions in the boxes demarcated by dotted line in the upper half of FIG. 4 (Side Lobe Detector).

Signal C-B=Output of Twr=75 nm
Signal A-B=Output of Twr=100 nm
Output=signal C-B-Betax (signal A-B-Alphax signal C-B)
Alpha=0.9, Beta=0.1

Figure 6:
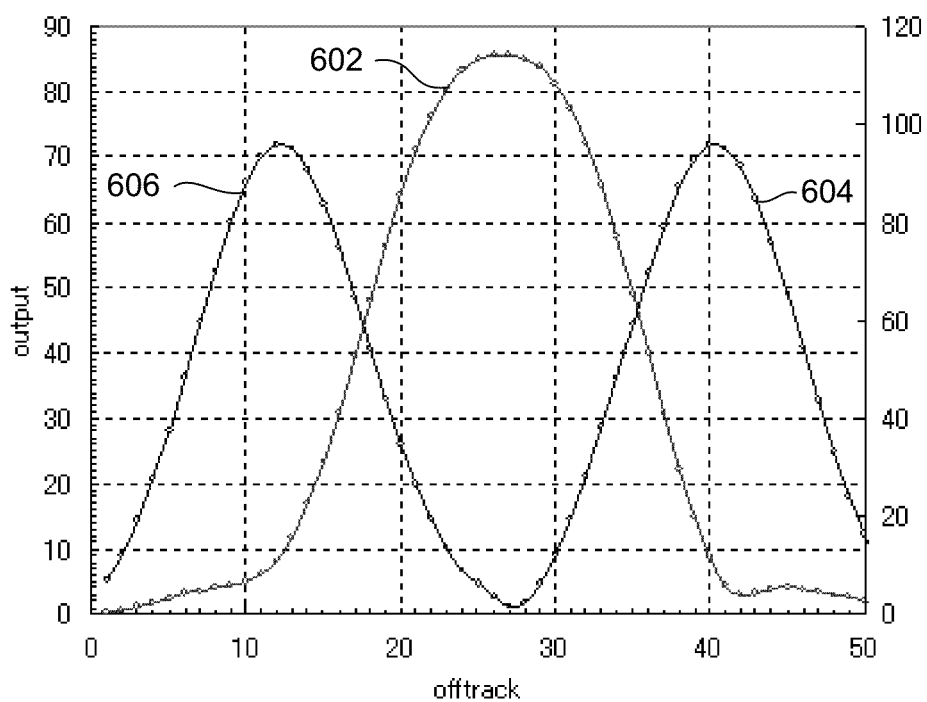
FIG. 6 graph showing a relationship between off-track location and signal output.

FIG. 6 shows the profile of off-track signals played back in the above described example. The horizontal axis denotes the off-track location (nm), and the vertical axis denotes the amplitude (Fourier transform amplitude) of the center frequency of the center track signal (line 602) and adjacent track signals (lines 604, 606). It is clear from the graph that three sets of magnetic information have been retrieved along the off-track position. The information retrieved in the center (line 602) is the "signal", and the adjacent magnetic information on the left and right (with respect to the center track) is noise (lines 604, 606). The calculated playback width of the signal region (half width) is 65.62 nm. Clearly, the playback profile is obtained within a range narrower than the playback width of 75 nm. The signal-to-noise ratio was calculated and an error rate of −5.67 squared was estimated based on previously estimated encoding performance and the amount of error collection processing. This shows excellent improvement in resolution performance.

Figure 7:
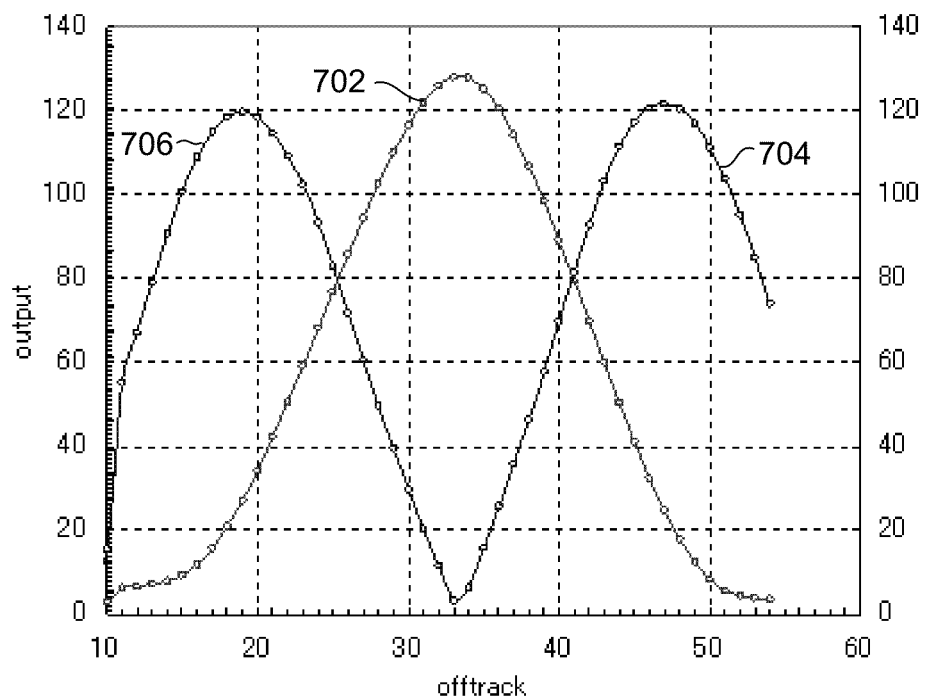
FIG. 7 is a graph showing a relationship between off-track location and signal output.

For comparative purposes, FIG. 7 shows the off-track signal profile when magnetized information is played back using a 75 nm sensor, without advantage of the above described dual sensor structure and method for attenuating side noise. In FIG. 7, line 702 represents the center track signal, and lines 704, 706 represent side track noise from adjacent data tracks. The playback width of the signal region (line 702) is 77.73 nm, or just slightly larger than the width of the sensor free layer width (i.e. 75 nm.). Compared to the results described above with reference to FIG. 6, it can be seen that the technique described above can effectively play back signals from a magnetic track that is approximately 10 nm narrower even though the sensors have the same minimum width dimensions.

Also, the signal-to-noise ratio of the signal 702 of FIG. 7 can be calculated and the error rate can be estimated to be −4.44 squared. The above described technique clearly improves the error rate by an order by an order of magnitude. It is clear from a comparison of FIGS. 6 and 7 that the main reason for the improved signal to noise ratio can be explained by a narrower noise profile than signal profile, eliminated on the right and left. This can be explained as the effect of subtracting adjacent information included in the signal amplitude.

In the explanation of the above described structure and technique, output was used from a playback element having a narrow sensor for the central signals. However, further embodiments are possible using a technique in which components common to the output from the wider sensor are extracted. This technique is effective when the output from the narrower playback sensor is insufficient. More specifically, the ratio of common components is increased by adding signal A-B and signal C-B described above with reference to FIGS. 2, 3 and 4. In other words, the gain of the wider sensor is suppressed, the output of the narrower sensor is matched with the appropriate amplitude to suppress the addition of adjacent magnetic information, and the common components are easily extracted.

This process requires the elimination of signal delays due to the positional relationship between the two sensors as explained above with reference to FIG. 4. In the perpendicular magnetic recording method, playback resolution is obtained by performing time differentiation on the playback signals (where output depends on the mount of magnetic charge integration). Thus, the desired center track signals can be obtained by adjusting the delay time accordingly (based on the conditions and the situation). The processing of the central track signals can be realized by the circuit functions inside of the box demarcated by dotted lines (signal detector) in the lower portion of the circuitry described in FIG. 4. After this processing has been completed, signals with a high signal-to-noise ratio can be obtained by subtracting the adjacent track noise.

Figure 8:
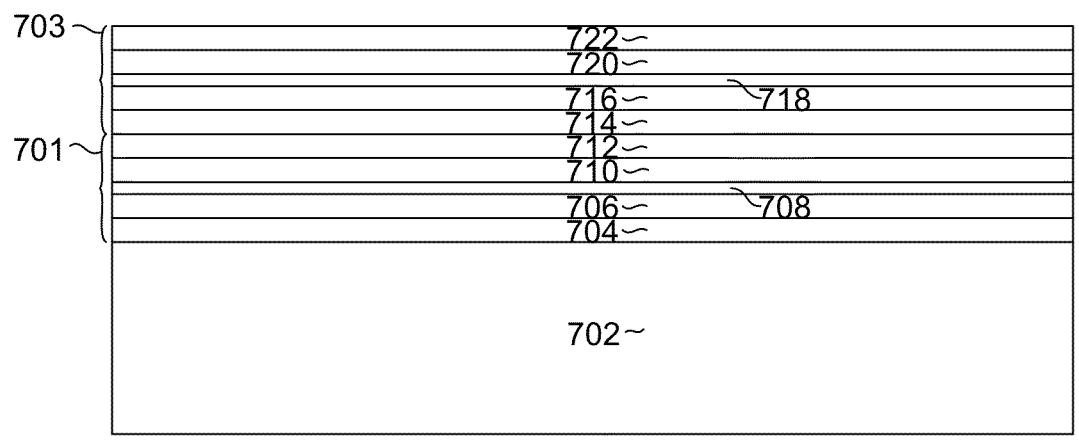
FIGS. 8-26 are views of a magnetic sensor in various intermediate stages of manufacture, illustrating a method for manufacturing a magnetic sensor according to an embodiment of the invention.

FIGS. 8-26 show a sensor in various intermediate stages of manufacture in order to illustrate a possible method for constructing a dual sensor structure such as that described above with reference to FIGS. 2 and 3. With reference now to FIG. 8, a bottom shield 702 is formed. A series of layers that constitute a bottom (first) sensor element 701, and a top (second) sensor element 703 are deposited over the bottom shield 702. The first sensor element 701 includes: a first layer of antiferromagnetic material (first AFM layer) 704; a first pinned layer structure 706; a first non-magnetic barrier (or spacer) layer 708; a first magnetic free layer 710 and a first capping layer 712. The second sensor element includes: a second layer of antiferromagnetic material (second AFM) 714; a second pinned layer structure 716; a second barrier (or spacer) layer 718; a second magnetic free layer 720 and a second capping layer 722. The first and second pinned layer structures 706, 716 can be anti-parallel coupled pinned layer structures such as the pinned layer structures 212, 228 described above with reference to FIG. 2, but are shown as a single layer in FIG. 8 for purposes of simplicity and clarity.

The thickness of the first capping layer 712 can be adjusted to accommodate needs unique to the above described structure and method for reducing track-width and reducing side noise. If the capping layer too thin, there will be an unacceptable level of magnetic interaction and exchange coupling between the layers of the second sensor 701 and the layers of the first second sensor 703, which would detrimentally affect the function of the second sensor. On the other hand, if the first capping layer 712 is too thick it might not be feasible to etch through both sensor elements 701, 703. In addition, as discussed above, the thickness of the capping layer 712 can be adjusted to create a desired amount of time delay between signals of the first and second sensor elements 701, 703. To this end, the first capping layer 712 preferably has a thickness of 2-4 nm, or more preferably about 3 nm.

Figure 9:
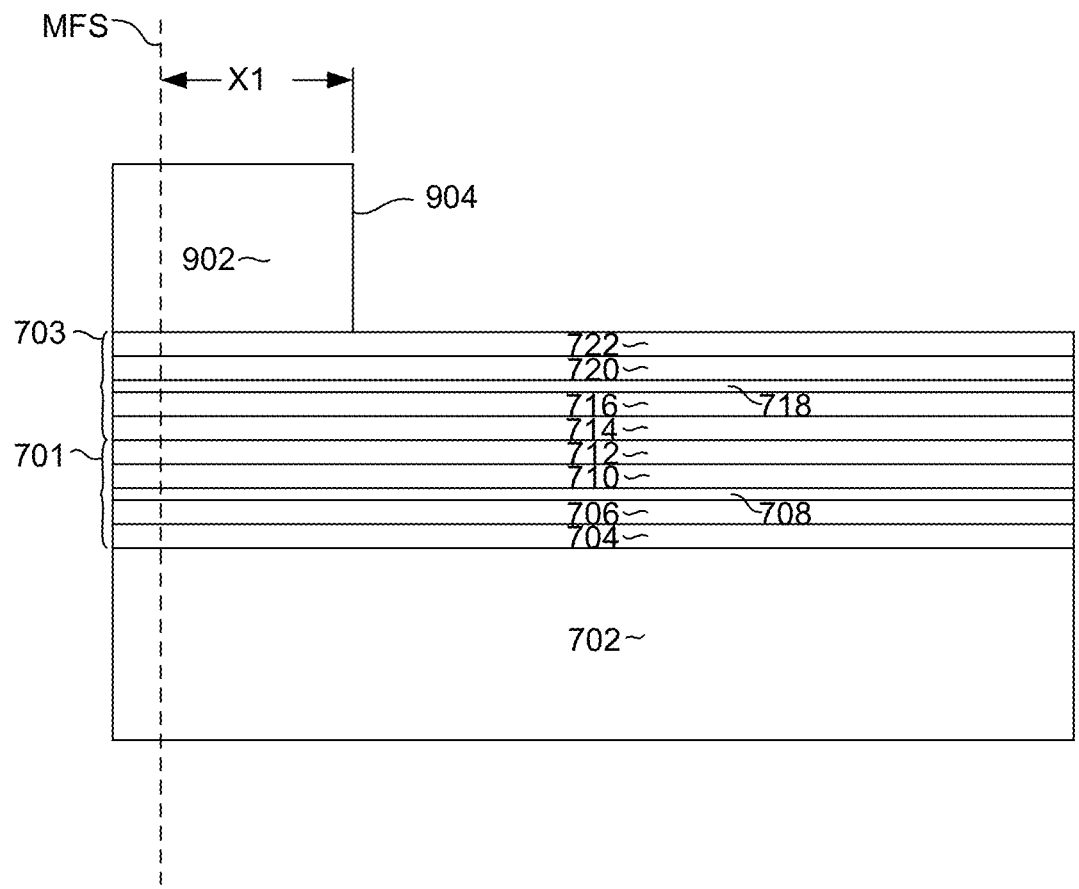
Figure 10:
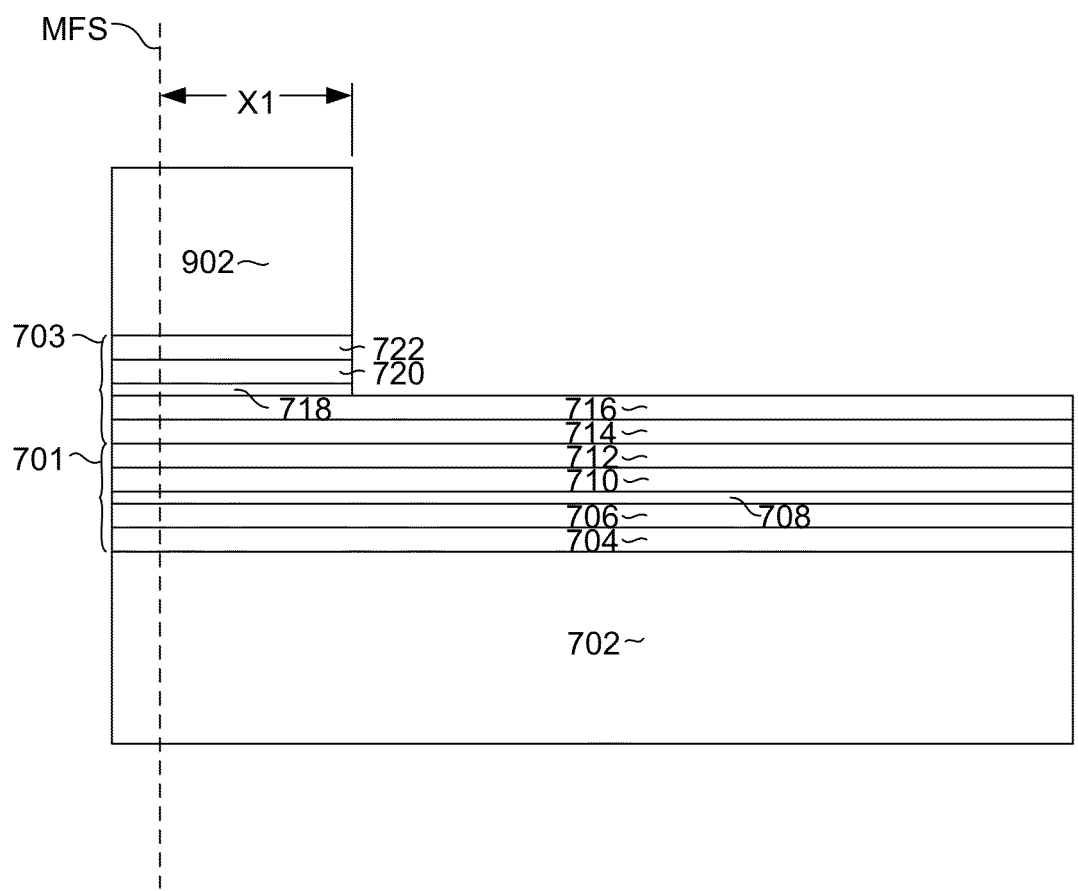

With reference now to FIG. 9, a first mask structure 902 is formed over the sensor layers 701, 703. The first mask structure has a back edge 904 that is located a desired first distance X1 from a media facing surface plane MFS, the distance X1 being chosen to define a stripe height of the second free magnetic layer 720 as will be seen. Then, with reference to FIG. 10 a first ion milling or reactive ion etching is performed to remove a portion of the layers 718, 720, 722 that are not protected by the first mask structure 902. The first ion milling or reactive ion etching can be terminated when the second barrier layer 718 has been reached or removed.

Figure 11:
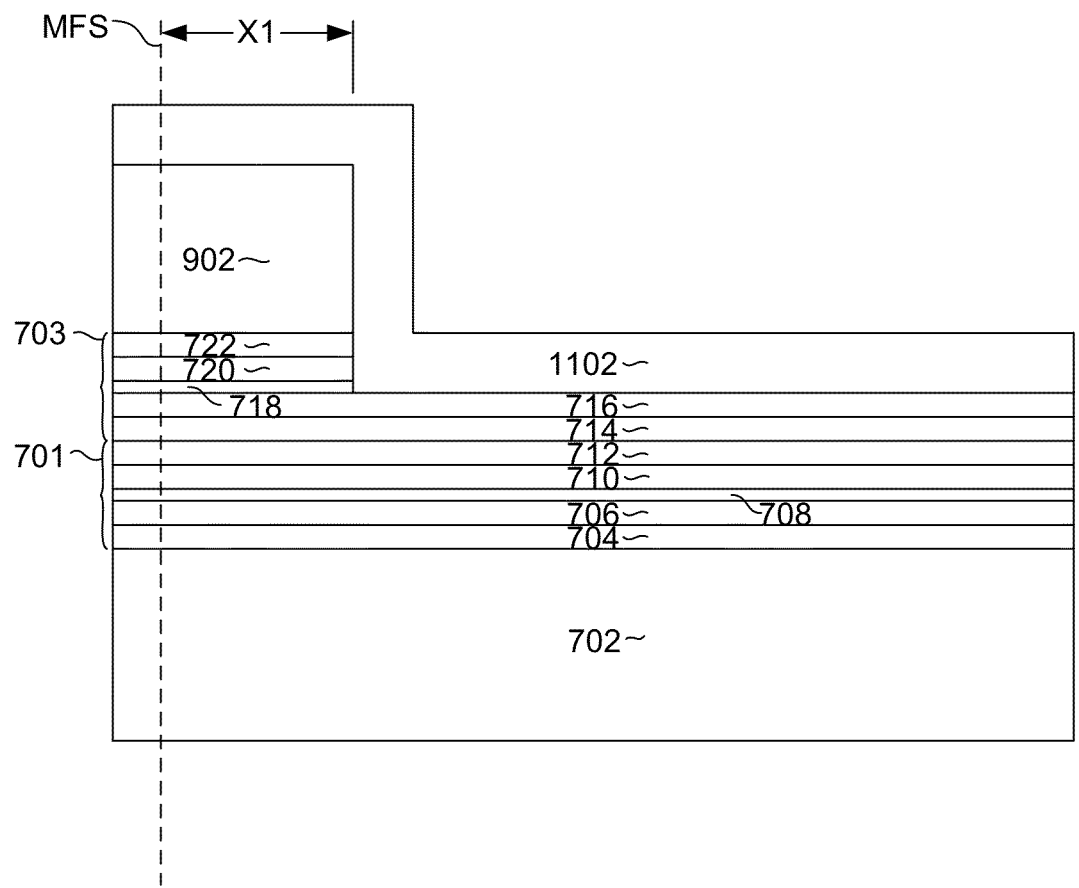
Figure 12:
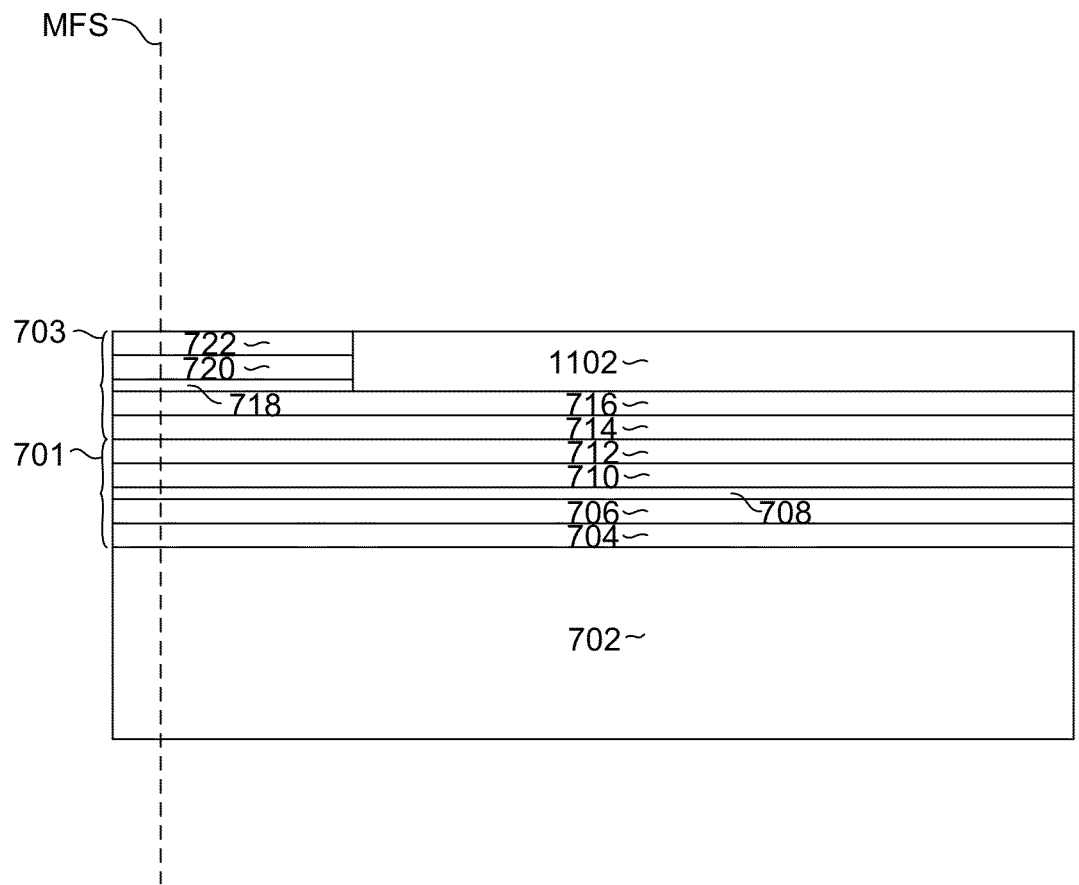

With reference to FIG. 11, a first layer of non-magnetic, electrically insulating material such as alumina ($Al_2O_3$) 1102 is deposited. A chemical mechanical polishing process (CMP) can then be performed to remove the mask 902 and planarize the structure, leaving a structure as shown in FIG. 12.

Figure 13:
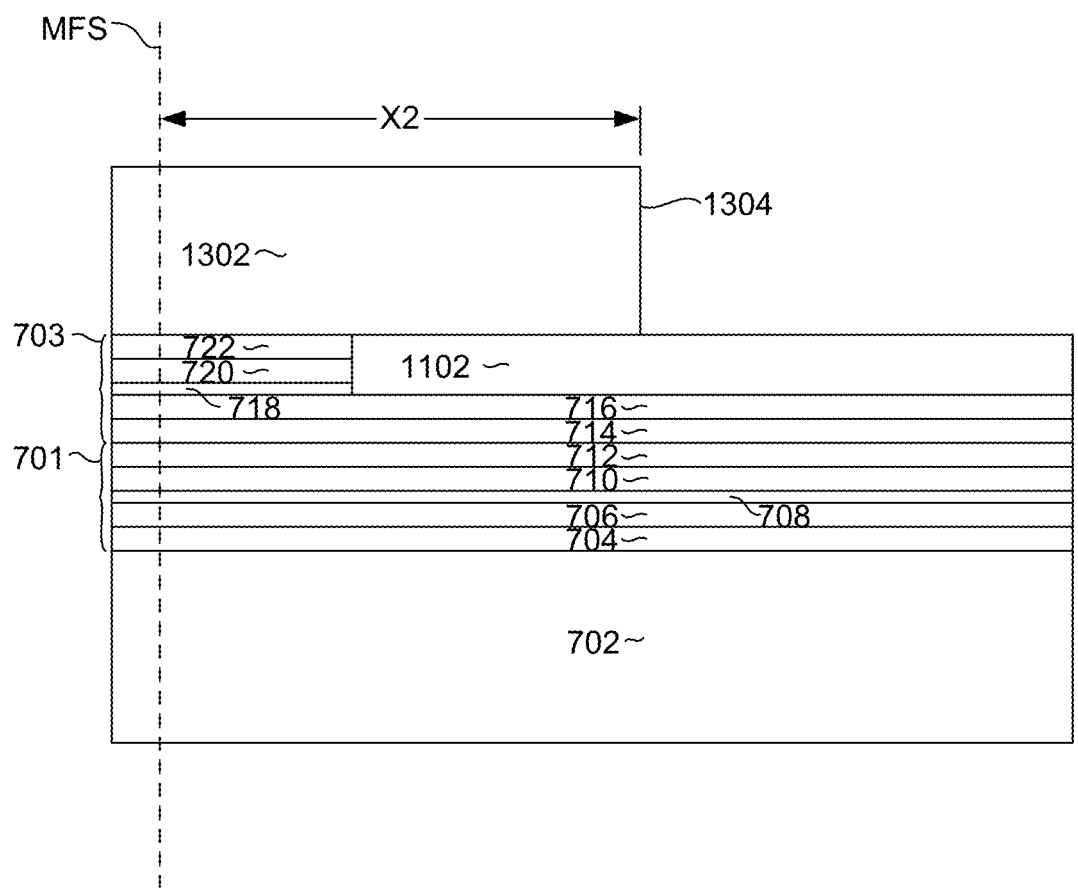

Then, with reference to FIG. 13, a second mask structure 1302 is formed over the sensor layers 701, 703 and first insulation layer 1102. As with the first mask 902 (FIG. 9), the second mask structure 1302 can include a photolithographically patterned photoresist material, but can include other layers as well, such as one or more hard mask layers, a liftoff layer, an image transfer layer, a bottom anti-reflective coating layer (BARC), etc. The second mask structure 1302 has a back edge 1304 that is located a second distance X2 from the media facing surface plane MFS, X2 being greater than X1.

Figure 14:
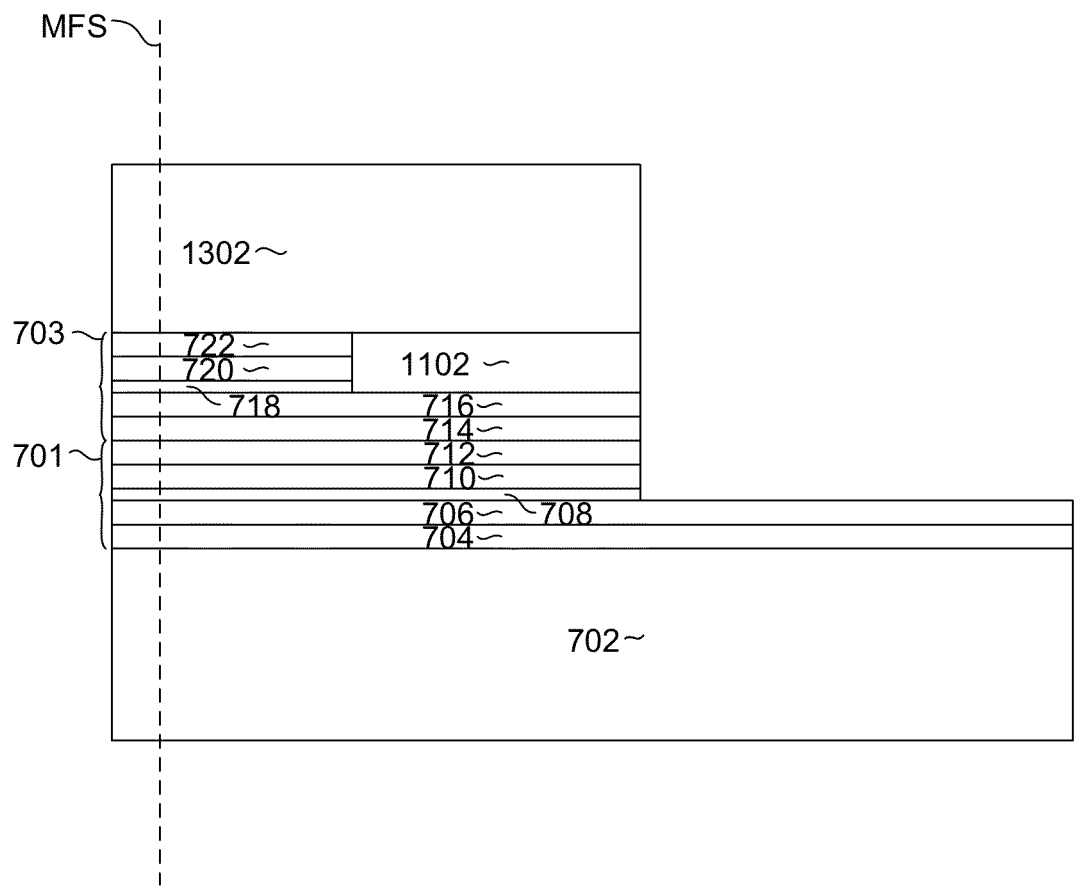
Figure 15:
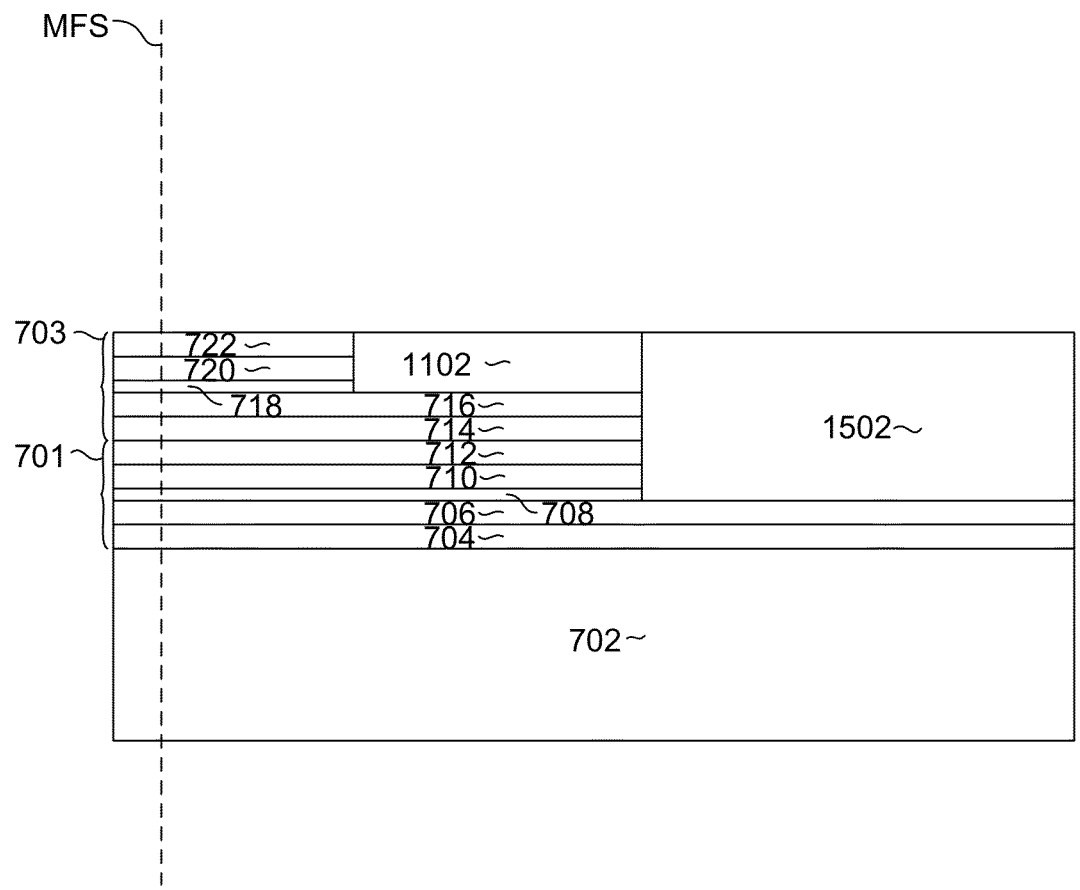

A second ion milling or reactive ion etching is then performed to remove portions of the first insulation layer 1102 and sensor layers 701, 703 that are not protected by the mask 1302, leaving a structure as shown in FIG. 14. As shown in FIG. 14, the second ion milling can be terminated when the first barrier layer 708 has been reached or removed, leaving the first pinned layer structure 706 and underlying first AFM layer 704 extending beyond other sensor layer. After this second ion milling or reactive ion etching process has been performed, a second layer of electrically insulating, non-magnetic material such as alumina ($Al_2O_3$) can be deposited and a chemical mechanical polishing process can be performed to remove the mask 1302, leaving a structure as shown in FIG. 15.

Figure 16:
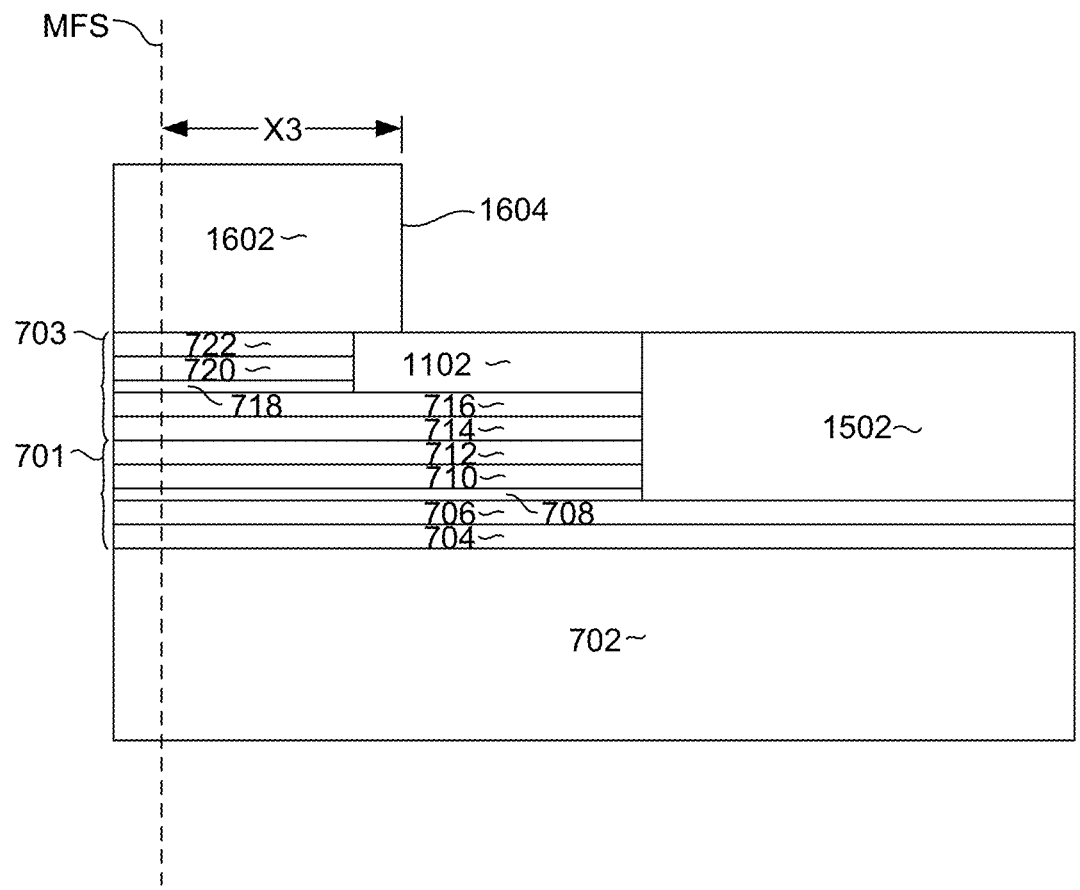
Figure 17:
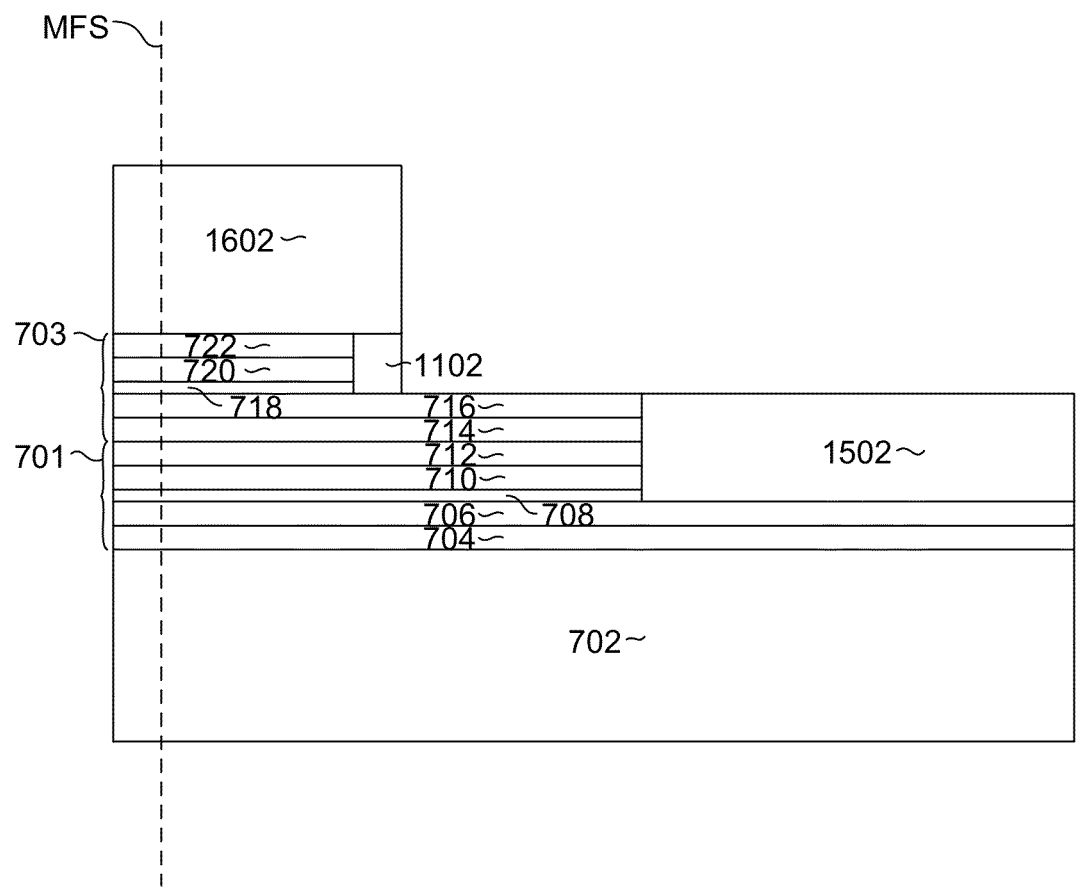

Then, with reference to FIG. 16, a third mask structure 1602 can be formed having a back edge 1604 that is located a distance X3 from the media facing surface MFS, the distance X3 being less than X2, but larger than X1. As discussed above, the mask 1602 can include a photolithographically patterned photoresist, but can include other layers as well such as a hard mask layer, a release layer, an image transfer layer, a bottom anti-reflective coating (BARC) layer, etc. A third ion milling or reactive ion etching process can then be performed to remove a portion of the first insulation layer 1102 that is not protected by the mask 1602. As shown in FIG. 17, this third ion milling or reactive ion etching can be terminated when the second pinned layer structure 716 has been reached, thereby exposing the second pinned layer 716. Alternatively, the third ion milling or reactive ion etching can be continued through the second pinned layer 716 to expose the first capping layer 716, or could even be continued to remove a portion of the first capping layer 716.

Figure 18:
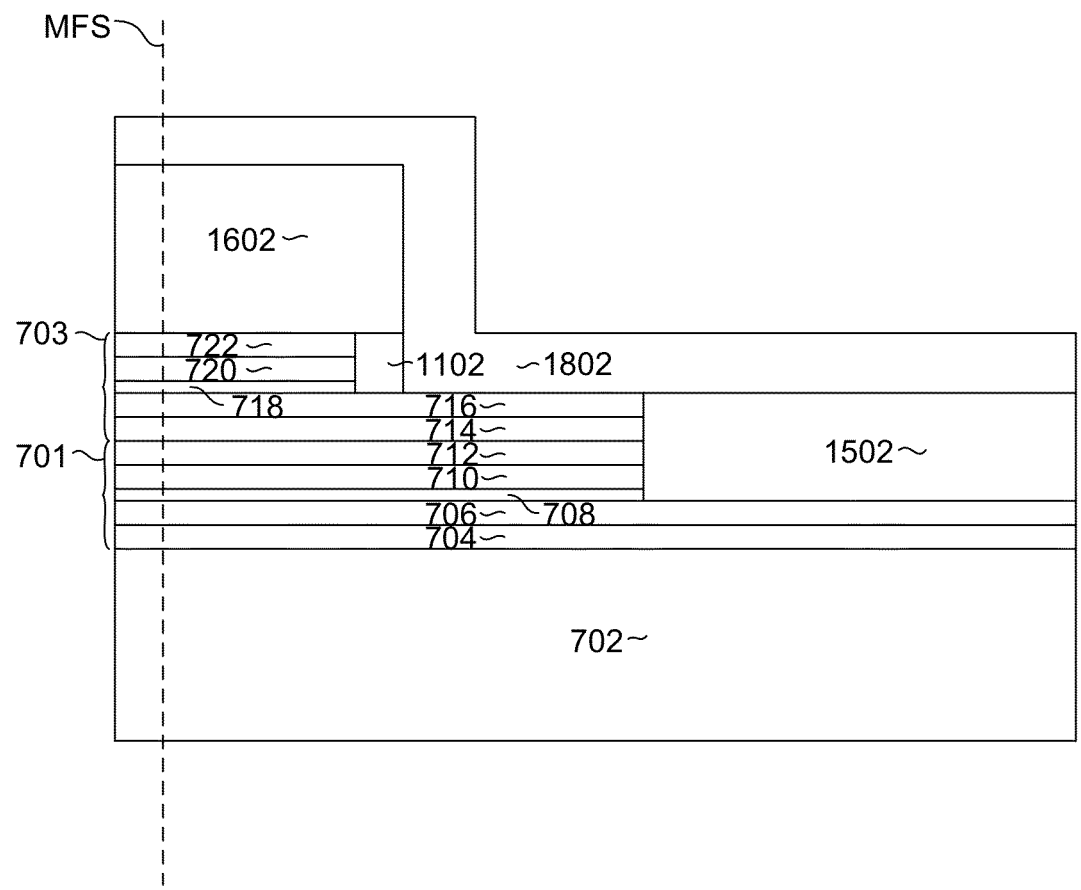
Figure 19:
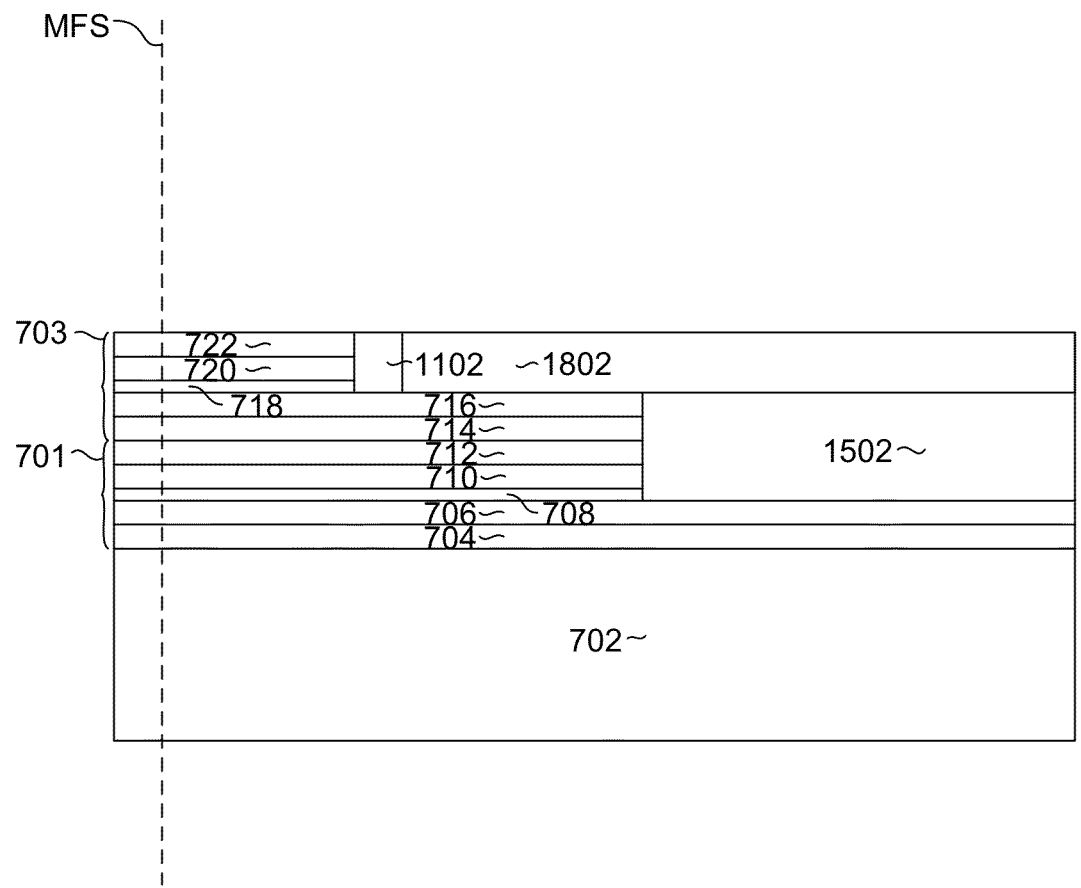
Figure 20:
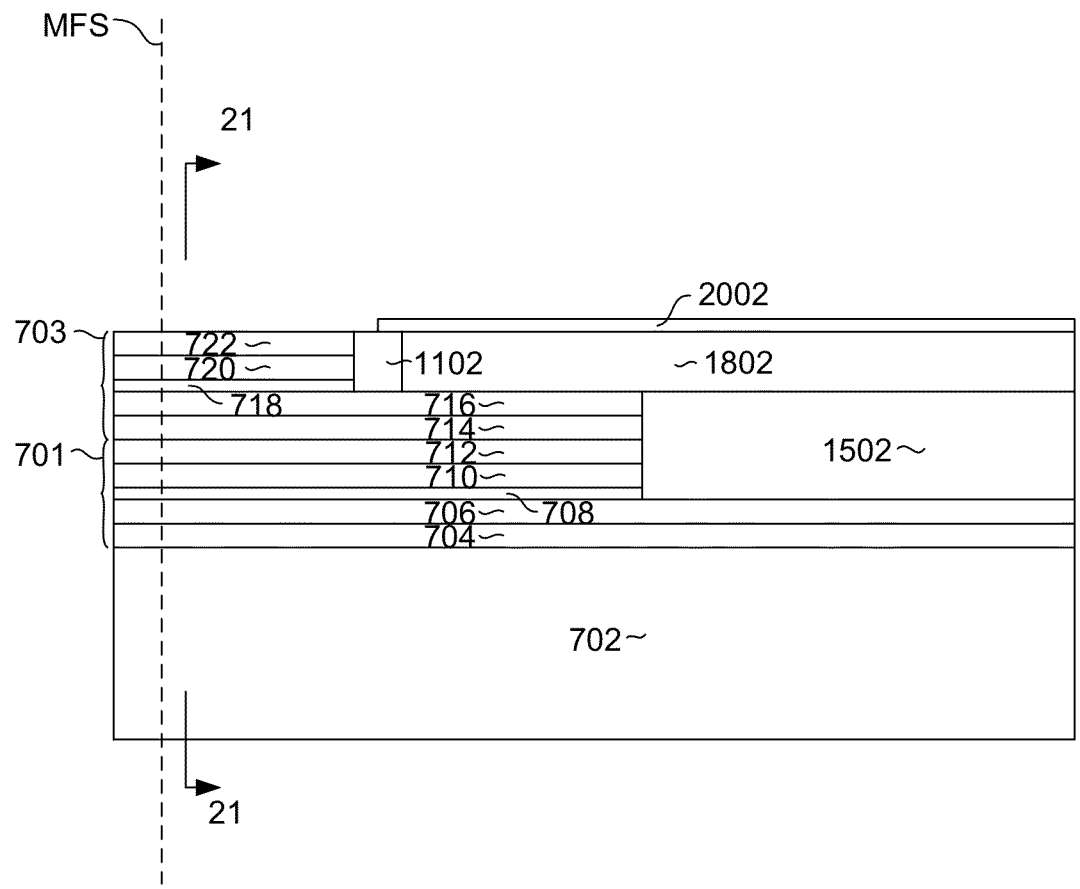

Then, with reference now to FIG. 18, a layer of electrically conductive material 1802 is deposited. The electrically conductive material 1802 can be a material such as Cu. A chemical mechanical polishing process (CMP) is then performed for mask removal and planarization, leaving a structure as shown in FIG. 19. Then, as shown in FIG. 20, a thin layer of electrically insulating material such as alumina ($Al_2O_3$) or silicon dioxide ($SiO_2$) is selectively deposited to cover at least a portion of the electrically conductive material 1802 and to extend over the insulating spacer structure 1102. The electrically conductive layer 1802 will provide electrical connection to the first sensor element 701 to connect lead B in FIG. 3. The electrically insulating layer 2002 insulates the conductive layer from an upper shield, not yet formed in FIG. 20.

Figure 21:
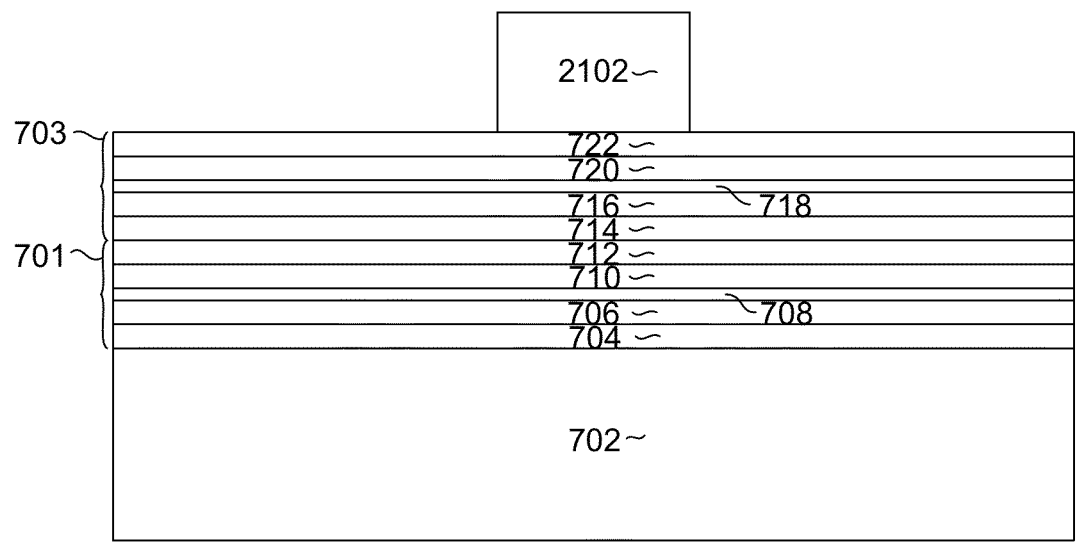

FIG. 21 shows a cross sectional view of a plane parallel with the media facing surface MFS, such as seen from line 21-21 of FIG. 20. While the previously described masking and milling operations illustrated a method for forming various stripe heights of the sensor, FIGS. 21-24 illustrate a method for forming a sensor track-width and for forming a tapered side wall that results in the lower or first sensor 701 being wider than the upper or second sensor 703. It should be pointed out, however, that while this description implies that the track-width is being defined after the various stripe heights have been defined, the track-width could also be defined before any of the above described stripe height defining processes have been performed.

With reference to FIG. 21, a track-width defining mask 2102 is formed over the sensor layers 701, 703. As with the previously described mask structures, the mask 2102 can include a photolithographically patterned photoresist material, and may also include other layers such as a hard mask layer, release layer, bottom anti-reflective coating, image transfer layer, etc.

Figure 22:
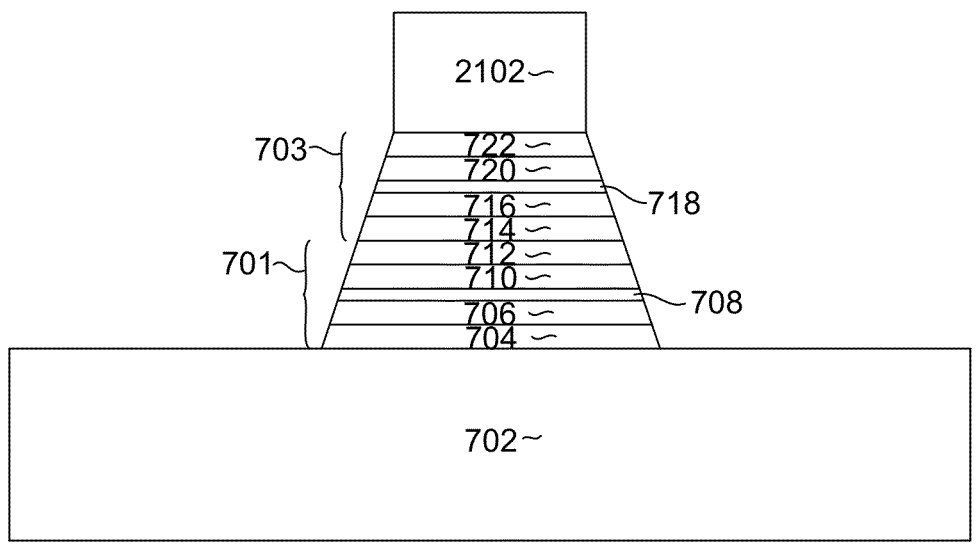

An ion milling or reactive ion etching is then performed to remove sensor material 701, 703 not protected by the track-width defining mask 2102, leaving a structure as shown in FIG. 22. The ion milling or reactive ion etching is performed in such a manner that shadowing from the track-width defining mask 2102 forms tapered side walls on the sensor layers 701, 703. Therefore, as shown in FIG. 22, the bottom sensor 701 is wider than the upper sensor 703.

Figure 23:
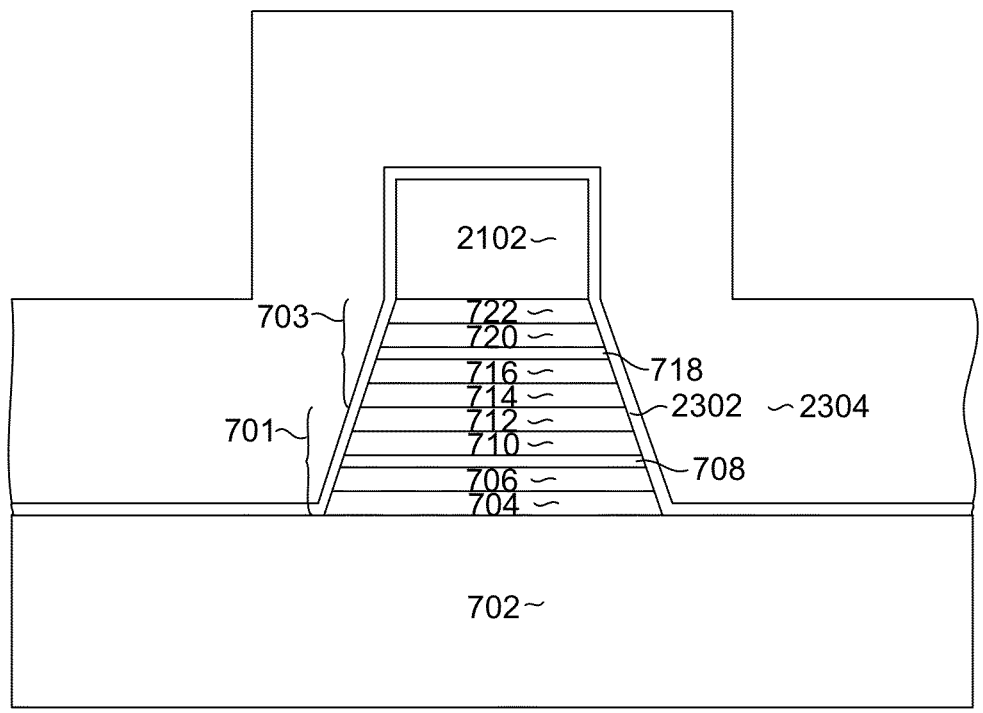
Figure 24:
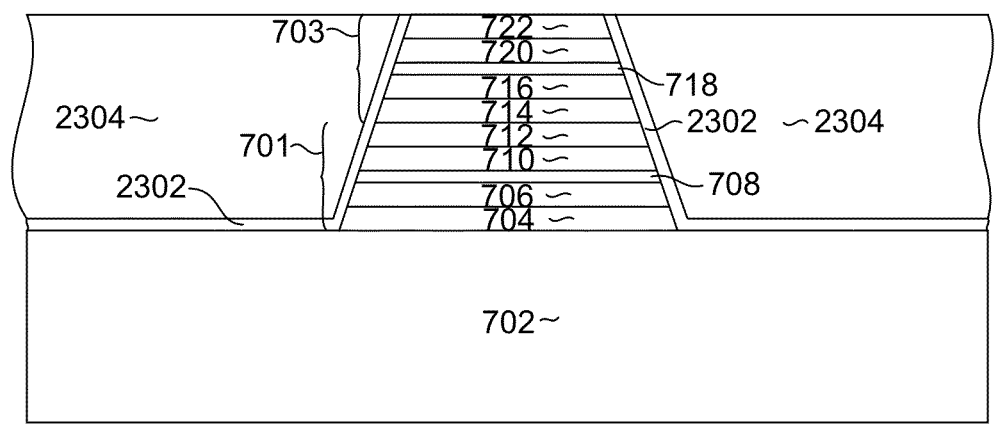

Then, with reference to FIG. 23, a thin layer of electrically insulating, non-magnetic material such as alumina ($Al_2O_3$) or silicon dioxide ($SiO_2$) 2302 is deposited, followed by a magnetic bias material 2304. The magnetic bias material 2304 can be a soft magnetic side shield material, or alternatively can be a hard magnetic material having a high magnetic coercivity. A chemical mechanical polishing process (CMP) can then be performed, leaving a structure as shown in FIG. 24.

Figure 25:
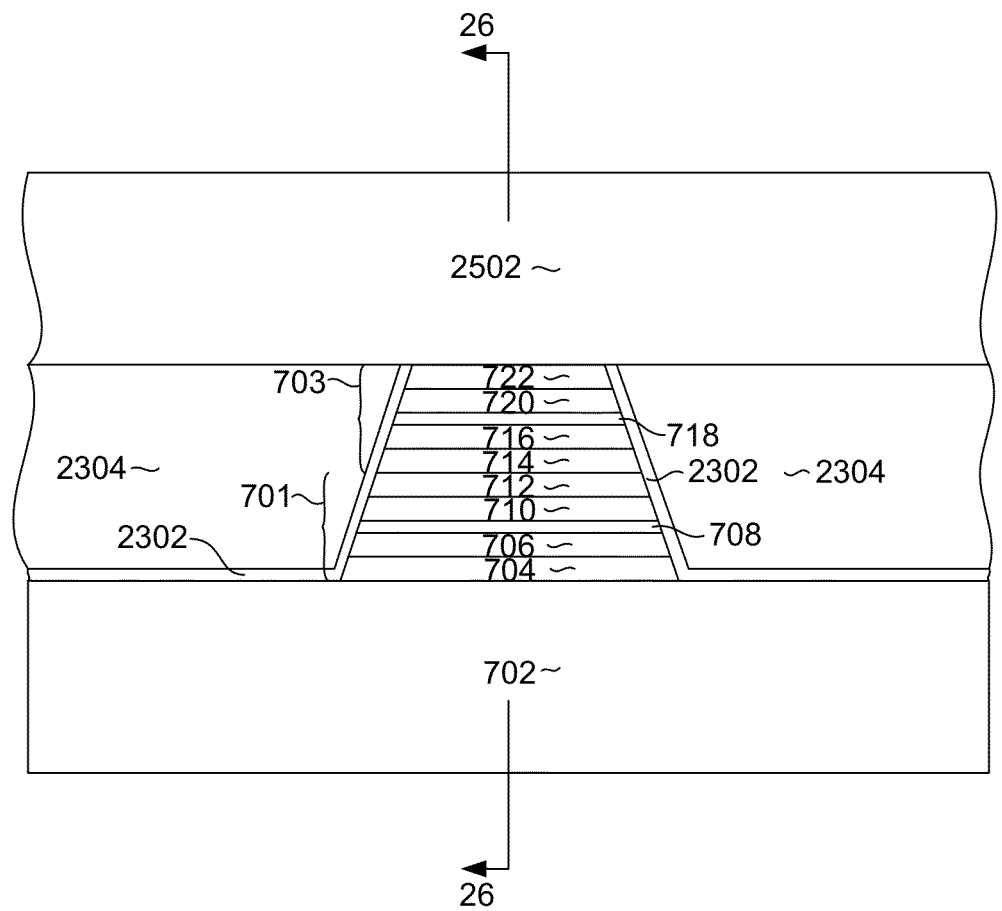
Figure 26:
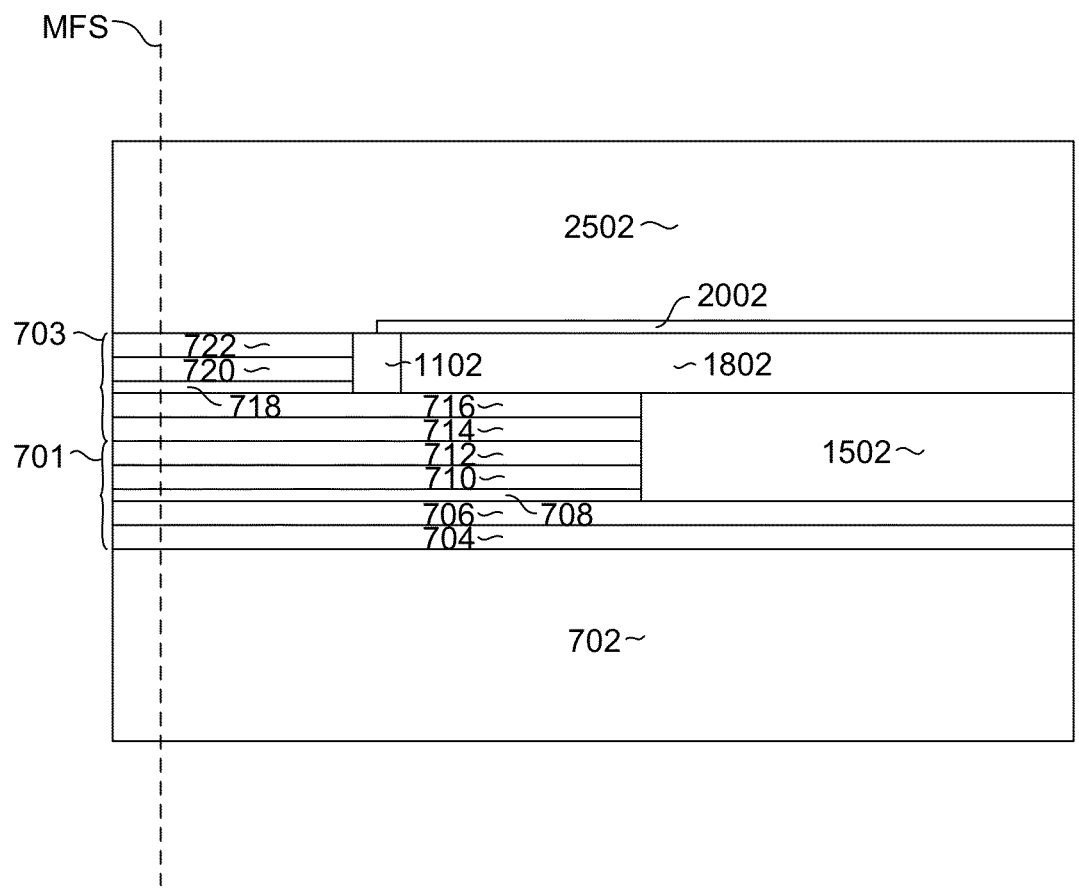

With reference to FIGS. 25 and 26, after the sensor has been formed as described above, an upper magnetic shield 2502 can be formed over the sensor elements 701, 703 and side gap 2304. FIG. 26 shows a side cross sectional view as seen from line 26-26 of FIG. 25, and shows how the insulation layer 2002 insulates the electrically conductive lead layer 1502 from the upper shield 2502.

While various embodiments have been described above, it should be understood that they have been presented by way of example only and not limitation. Other embodiments falling within the scope of the invention may also become apparent to those skilled in the art. Thus, the breadth and scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A magnetic read head comprising:
a first sensor element having a first track-width; and
a second sensor element having a second track width that is smaller than the first track-width; wherein
the first and second sensor elements together define a sensor stack;
the first sensor element includes a first magnetic free layer; and
the second sensor stack includes a second magnetic free layer; the magnetic read head further comprising;
first and second electrically conductive magnetic shields, the sensor stack being located between the first and second magnetic shields;
a first lead electrically connected with the first electrically conductive magnetic shield;
a second lead electrically connected with the sensor stack at a location between the first and second magnetic free layers; and
a third lead electrically connected with the second electrically conductive magnetic shield.

2. The magnetic read head as in claim 1 wherein the first and second sensor elements are aligned with one another along a data track direction with the second sensor element being in a down track direction relative to the first sensor element.

3. The magnetic read head as in claim 1, wherein:
the first sensor element includes a first pinned layer structure, a first magnetic free layer structure, a first barrier layer sandwiched between the first magnetic free layer structure and the first magnetic pinned layer structure, and a first capping layer formed over the first magnetic free layer structure;
the second sensor element includes a second pinned layer structure, a second magnetic free layer structure, a second non-magnetic layer sandwiched between the second magnetic free layer structure and the second magnetic pinned layer structure, and a second capping layer formed over the first magnetic free layer structure;
wherein the first sensor element extends beyond the second sensor element in a direction measured from a media facing surface; and an electrically conductive connection structure electrically connected with the first capping layer in a region where the first sensor element extends beyond the second sensor element.

4. The magnetic read head as in claim 3 further comprising:
a first insulation structure, electrically insulating the electrically conductive connection structure from the second sensor element; and
a second insulation structure electrically insulating the electrically conductive connection structure from the second magnetic shield.

5. An apparatus for magnetic data recording, comprising:
a sensor stack sandwiched between first and second magnetic shields, the sensor stack including a first magnetic sensor element having a first magnetic free layer and a second magnetic sensor element having a second magnetic free layer, the first magnetic free layer being wider than the second magnetic free layer;
circuitry connected with the sensor stack so as to read a first signal from the first sensor element and a second signal from the second sensor element, the circuitry being functional to subtract out adjacent track signal noise from the first and second signals based on the different widths of the first and second free layers; and
first, second and third leads for connecting the circuitry with the sensor stack, the first lead being electrically connected with the first shield, the second lead being electrically connected with the sensor stack at a location between the first and second magnetic free layers and the third lead being electrically connected with the second magnetic shield;
wherein the first sensor element has an extended portion that extends from a media facing surface a distance greater than the second sensor element, and wherein the second lead electrically connects with the extended portion of the first sensor element; and
an electrically conductive structure formed on the extended portion of the first sensor element and an electrically insulating structure separating the electrically conductive structure from the second sensor element.

6. The apparatus as in claim 5 wherein the second sensor element is located in a down track direction relative to the first sensor element, and wherein the circuitry is functional to subtract out adjacent track signal noise from the first and second signals based on both the difference in widths of the first and second magnetic free layers and also the relative down track location of the second sensor element relative to the first magnetic sensor element.

7. The apparatus as in claim 5, further comprising an electrically conductive layer separating the electrically conductive structure from the second magnetic shield.

8. A magnetic data recording system, comprising:
a housing;
a magnetic media moveably held within the housing;
an actuator mounted within the housing;
a slider connected with the actuator for movement adjacent to the magnetic media; and
a magnetic read head formed on the slider, the magnetic read head further comprising a first sensor element having a first track-width, and
a second sensor element having a second track width that is smaller than the first track-width;
circuitry connected with the first and second sensor elements so as to read a first signal from the first sensor element and a second signal from the second sensor element, the circuitry being functional to subtract out side track data noise based on the difference in widths of the first and second sensor elements;
wherein:
   the first and second sensor elements together form a sensor stack;
   the first sensor element includes a first magnetic free layer, and the second sensor element includes a second magnetic free layer;
   the sensor stack is located between first and second magnetic shields;
   the magnetic circuitry is electrically connected with the read head by first, second and third electrically conductive leads;
   the first electrically conducive lead is connected with the first magnetic shield;
   the second electrically conductive lead is connected with the sensor stack at a location between the first and second magnetic free layers; and
   the third electrically conducive lead is connected with the second magnetic shield.

9. The magnetic data recording system as in claim 8, wherein the first and second sensor elements are aligned along a data track direction and the second sensor element is located in a down track direction relative to the first sensor element.

10. The magnetic data recording system as in claim 9, wherein the circuitry is functional to subtract out side track signal noise based on the difference in widths of the first and second sensor elements and also based on a signal time delay resulting from the down track location of the second sensor relative to the first sensor.

11. The magnetic data recording system as in claim 8, wherein the first sensor element has an extended portion that extends beyond the first sensor element in a direction away from a media facing surface, and wherein the second electrically conductive lead is electrically connected with the extended portion of the first sensor element.

12. The magnetic data recording system as in claim 11, further comprising, an electrically conductive structure formed on the extended portion of the first sensor element, and an electrically insulating structure separating the electrically conductive structure from the second sensor element.

* * * * *